United States Patent [19]

Wägli

[11] 4,429,223

[45] Jan. 31, 1984

[54] INFRARED INTRUSION DETECTOR

[75] Inventor: Peter Wägli, Uetikon, Switzerland

[73] Assignee: Cerberus AG, Männedorf, Switzerland

[21] Appl. No.: 305,032

[22] Filed: Sep. 23, 1981

[30] Foreign Application Priority Data

Oct. 24, 1980 [CH] Switzerland ........................ 7926/80

[51] Int. Cl.³ ................................................ G01J 1/00

[52] U.S. Cl. ................................... 250/342; 250/353

[58] Field of Search ............... 250/338, 340, 342, 353; 340/565, 567; 350/1.4, 1.3, 96.1, 96.23, 96.28, 452

[56] References Cited

U.S. PATENT DOCUMENTS

| | | | |
|---|---|---|---|
| 3,703,718 | 11/1972 | Berman | 250/338 |
| 3,760,399 | 9/1973 | Schwarz | 340/567 |
| 3,829,693 | 8/1974 | Schwarz | 250/342 |
| 3,958,118 | 5/1976 | Schwarz | 340/567 |
| 4,081,680 | 3/1978 | Keller | 250/342 |
| 4,087,688 | 5/1978 | Keller | 250/342 |
| 4,166,955 | 9/1979 | Keller | 250/342 |
| 4,181,398 | 1/1980 | Sick | 350/96.1 |
| 4,238,675 | 12/1980 | Turlej et al. | 250/353 |
| 4,321,594 | 3/1982 | Galvin et al. | 250/353 |

*Primary Examiner*—Janice A. Howell

*Attorney, Agent, or Firm*—Werner W. Kleeman

[57] ABSTRACT

An infrared intrusion detector wherein a plurality of separate radiation receiving regions or fields of view are focused by a single focusing optic, for instance a reflector or a Fresnel lens upon a single sensor element through an elongate or lengthwise extending radiation collecting element. The radiation collecting element can be constituted by an internally metal coated tube or a transparent body having a reflecting surface layer or coating, wherein the reflection coating is interrupted by radiation inlet openings. The infrared radiation which is focused by the focusing optic enters through such openings into the interior of the radiation collecting element and arrives, after having been reflected a number of times, at the sensor element which is mounted at an end side thereof.

14 Claims, 4 Drawing Figures

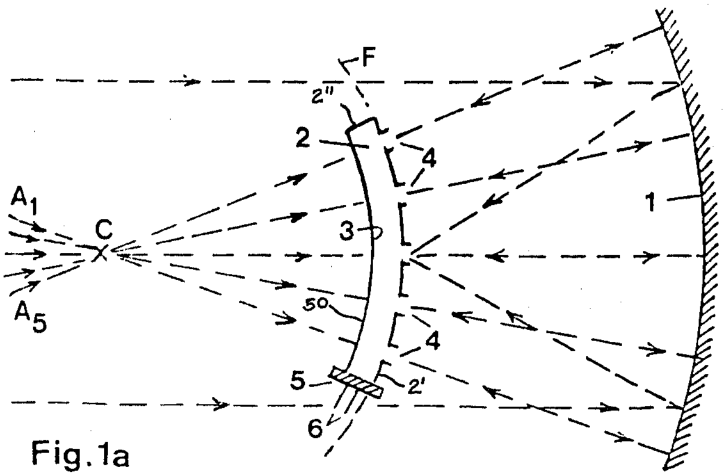
Fig.1a
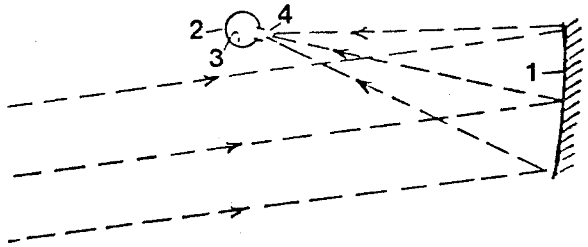
Fig.1b
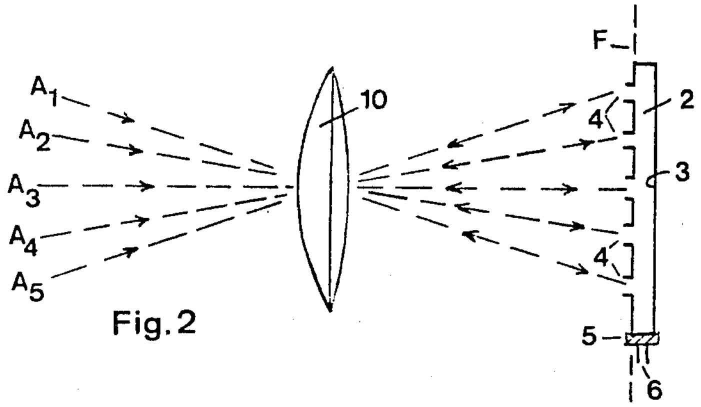
Fig.2
Fig.3
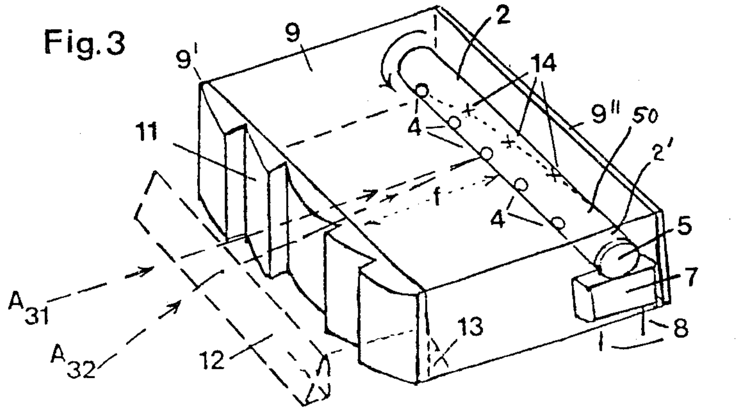

INFRARED INTRUSION DETECTOR

CROSS REFERENCE TO RELATED CASE

This application is related to the commonly assigned, copending U.S. application Ser. No. 06/310,917, filed Oct. 13, 1981, entitled "Optical Arrangement for an Infrared Intrusion Detector," and listing as the inventors Peter Wägli and Alois Zetting.

BACKGROUND OF THE INVENTION

The present invention relates to a new and improved construction of infrared intrusion detector which is of the type containing optical focusing means and a sensor arrangement, wherein the infrared radiation received from a number of separate receiving regions is taken-up and evaluated for the purpose of sounding an alarm signal upon there occurring a predetermined change in the received or taken-up radiation.

With such intrusion detectors the infrared radiation which is emitted by an individual at a monitored region is evaluated. If the monitored region is divided into a number of separate receiving regions or fields of view between which there are located dark fields or zones, then each movement of a person causes a modulation of the infrared radiation received by the sensor element. This modulation can be evaluated by means of a conventional evaluation circuit for the purpose of indicating that an intruder has entered the monitored region or area and for the further purpose of giving an alarm signal.

In order to obtain the requisite separate receiving regions or fields of views it is already known in this technology to employ different optical arrangements. A particularly good sensitivity can be realized if there is received from all of the receiving regions as large a quantity of radiation as possible and such received quantity of radiation evaluated. From U.S. Pat. Nos. 3,760,399, 3,829,693 or 3,958,118 there has been taught employing with intrusion detectors for this purpose a reflector which is common to all of the receiving regions or fields of view. This reflector focuses the radiation which arrives from such receiving regions upon a number of juxtapositioned sensor elements. Since there are employed a multiplicity of such sensor elements there is required, however, a complicated and disturbance-prone evaluation circuit at which there is connected the afore-mentioned multiplicity or plurality of sensor elements. Additionally, there is markedly limited the number of possible sensor elements, and thus, the number and selection of the receiving regions.

In other prior art references, for instance, U.S. Pat. Nos. 3,703,718, 4,058,726 or 4,081,680 it is known to avoid these drawbacks in that there is provided a multiplicity of reflectors which, in each case, focus radiation from one receiving region or field of view upon a common sensor element. However, with this system design there must be tolerated the drawback that only a small quantity of radiation is received from each receiving region, and thus, the sensitivity is reduced or the number of receiving regions must be limited.

In German Pat. No. 2,719,191 there is disclosed an infrared radiation intrusion detector wherein the reflector surfaces are constructed as part of a spherical surface, and the selected surface part determines the detectable solid angle. The infrared radiation is conducted to a radiation receiver by means of a radiation conductor bundle composed of a multiplicity of individual radiation-conducting elements, for instance internally coated hollow conductors. However, it is technically difficult to group together the radiation beam at a detector having sufficiently small dimensions.

In German Patent Publication No. 2,836,462 there is described a room or area monitoring receiving device wherein the infrared radiation is directed by a focusing lens through a tube onto a radiation transducer or converter arranged at the focal plane. By means of a reflection layer or coating arranged at the inner surface of the tube it is possible by accomplishing multiple reflections to project radiation emanating from further sector-shaped regions upon the radiation transducer. The sensitivity of the monitoring device is, however, markedly reduced for the outer regions because of the curved focusing surface of the focusing means.

SUMMARY OF THE INVENTION

Therefore, with the foregoing in mind it is primary object of the present invention to provide a new and improved construction of an infrared intrusion detector which is not afflicted with the aforementioned drawbacks and limitations of the prior art constructions.

Another and more specific object of the present invention aims at avoiding the aforementioned disadvantages of the state-of-the-art intrusion detectors and, in particular, providing an infrared intrusion detector which is capable of positively and reliably taking-up or receiving, and with increased sensitivity, with a single sensor element and a simple optical arrangement possessing small dimensions, infrared radiation from a multiplicity of randomly selectable receiving regions or fields of view.

Yet a further significant object of the present invention is directed to a new and improved construction of infrared intrusion detector which is relatively simple in design, extremely reliable in operation, economical to manufacture, not readily subject to breakdown or malfunction, and requires a minimum of maintenance and servicing.

Now in order to implement these and still further objects of the invention, which will become more readily apparent as the description proceeds, the infrared intrusion detector of the present development is manifested by the features that the sensor arrangement contains a lengthwise extending or elongated radiation collecting element arranged at least approximately at the focusing surface of the focusing means. The surface of the radiation collecting element is structured such that it reflects radiation inwardly. The radiation collecting element possesses at its lengthwise side a number of radiation inlet or entry openings and at its end side or face an infrared sensor element.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1*a* schematically illustrates in top plan view the optical arrangement for an intrusion detector containing a reflector;

FIG. 1*b* illustrates the arrangement of FIG. 1 in sectional view;

FIG. 2 illustrates a second optical arrangement containing a collecting lens; and FIG. 3 illustrates an infrared intrusion detector equipped with a Fresnel lens.

DETAILED DESCRIPTION OF THE PREFERRED EMBODIMENTS

Describing now the drawings, it is to be understood that only enough of the construction of the infrared intrusion detector has been shown as will enable those skilled in this technology to readily understand the underlying principles and significant concepts of the present development. Turning attention now to FIGS. 1*a* and 1*b* there is illustrated therein in top plan view and in cross-section an optical arrangement for an infrared intrusion detector. Here, there is used as the focusing means a reflector 1 which, for instance, can be constructed as a spherical mirror having a center C. The focusing surface F of such a spherical mirror or reflector, as is known is a sphere concentric thereto and of half the radius. Arranged at this focusing surface F is a lengthwise extending or elongated element 2 serving for collecting the infrared radiation which has been focused at the focusing surface F. This radiation collecting element 2 can be constructed, for instance, as an air accessible tube or pipe having a metal coated or mirrored inner surface 3 or as an infrared radiation transparent body upon whose surface 3 there is applied a reflecting layer or coating. The cross-section of this radiation collecting element 2 can be, for instance, circular in order to simplify fabrication or adjustability. The lengthwise axis of this lengthwise extending or elongated radiation collecting element 2 is curved in accordance with the focusing surface F.

In order to be able to mount the radiation collecting element 2 in a simple manner in the intrusion detector it can be advantageously flexible. When using an appropriately corrected optic or optical system as the focusing means it is, however, also possible to employ a tube or transparent body having a straight axis. At one end face or side 2' of the tube or transparent body, generally indicated by reference character 50, there is arranged a sensor element 5, whereas the other end 2'' can be reflectively or metallically coated or carries a further sensor element.

In order to enable the radiation which has been focused by the reflector 1 at the surface of the radiation collecting element 2 to enter the radiation collecting element 2, the surface of the latter is advantageously provided with radiation inlet or entry openings 4. In the case where the radiation collecting element 2 is constructed as an air-filled tube or pipe these radiation inlet or entry openings 4 can be in the form of holes provided at its shell or jacket, whereas with the embodiment employing as the radiation collecting element 2 a transparent body the radiation entry or inlet openings 4 can be constituted by interruptions or breaks in the reflective or metal coating. The radiation entering by means of the radiation inlet openings 4 is reflected a number of times within the radiation collecting element 2 at its inner surface 3 and finally arrives at the sensor element 5 which is mounted, as stated, at an end side or face, here the end 2', of such radiation collecting element 2. This sensor element 5 is connected by means of connection lines 6 with any suitable evaluation circuit as is well-known in this technology.

Since the area of the radiation inlet openings 4 only constitutes an extremely small fraction or part of the total inner surface of the radiation collecting element 2, practically almost all of the entire radiation which has penetrated into the interior of the radiation collecting element 2 reaches the sensor element 5 without there arising any appreciable losses in such radiation. The aforementioned radiation inlet openings 4 are oriented exactly at those locations where the radiation arriving from certain desired receiving regions or fields of view is focused by the reflector 1. Each radiation inlet opening 4 therefore is operatively associated with a predetermined radiation receiving region or field of view, the aperture angle of which is dependent upon the dimensions of the radiation inlet opening 4 and the quality of the imaging. The radiation inlet openings 4, depending upon the desired pattern of the receiving regions, can be appropriately provided at the surface of the radiation collecting element 2.

The arrangement therefore can be accomodated in a most simple manner to the desired conditions of use. In this regard there is completely adequate a particularly simple optic or optical system, and there is only required a single sensor element which can be connected at a correspondingly simple evaluation circuit which is not prone to disturbances. Furthermore, since there is not needed any segment optic or optical system, rather only a single reflector, it is therefore possible to attain an optimum sensitivity.

The focusing means constructed as a spherical mirror or reflector and used in the described embodiment also can be designed in a different manner. For instance, there can be employed a parabolic mirror or reflector which delivers a better imaging at least at the region of the axis, or there can be used a refraction optic or optical system which can be easily corrected such that the focus surface is not curved very much, i.e. is almost flat or planar so that the radiation collecting element 2 can possess a cylindrical configuration having a straight axis.

FIG. 2 illustrates an exemplary embodiment using a collecting lens 10 as the focusing means. The radiation collecting element 2 is constructed in a manner analogous to that described in conjunction with the preceding embodiment disclosed with reference to FIG. 1*a* and a collecting lens 10 is arranged at the focus surface F. Each of the radiation inlet or entry openings 4 corresponds to a separate receiving direction or receiving region $A_1, A_2 \ldots A_5$.

FIG. 3 illustrates an infrared intrusion detector containing a housing 9, the front side 9' of which is occupied by a focusing means 11 which is constructed as a central section of a Fresnel step lens. At the rear side 9'' of the housing 9, the spacing of which rear side 9'' from the front side 9' corresponds to the focal length F of the Fresnel lens 11, there is again provided a tubular-shaped radiation collecting element 2 having different openings 4 confronting the Fresnel lens 11. At an end side or face 2' of the tube or pipe-like element 50 constituting the radiation collecting element 2 there is likewise here arranged an infrared sensor element 5 which is connected with an integrated circuit 7 which, for instance, may be constructed in accordance with the teachings of either U.S. Pat. No. 4,179,691 or U.S. Pat. No. 4,166,955. The integrated circuit 7 constitutes an evaluation circuit for the signals received from the sensor element 5. Each opening 4 again corresponds to a radiation receiving region or field of view, and such evaluation circuit 7 delivers a signal by means of the signal lines 8 as soon as the infrared radiation received by the sensor element 5 alters in a manner which is characteristic for the movement of an intruder through the radiation receiving regions.

According to an advantageous further development of the invention it is possible to provide one or more prisms before or after parts of the collecting lens 10, by means of which prisms there can be split into a number of beams the individual received radiation or radiation beams. Consequently, the number of radiation receiving regions can be multiplied in the event there can be tolerated a certain intensity attenuation of the individual regions or fields of view.

With the infrared intrusion detector illustrated in FIG. 3 there can be arranged, for instance, forwardly of the lower half of the Fresnel lens 11 a prism 12. This prism 12 ensures that the radiation impinging at the lower half of the prism will be deflected through a certain angle, whereas the radiation impinging at the upper half of such prism remains unaffected. Each receiving region therefore is split into two separate regions. For instance, the upper lens or prism half focuses radiation emanating from the direction $A_{31}$ upon the intermediate opening 4, while the lower half of the lens or prism focuses radiation emanating out of the thereto inclined direction $A_{32}$. When working with a multiplicity of openings it is therefore possible to obtain in a simple manner an infrared intrusion detector whose receiving regions or fields of view have the shape of two radiation curtains which must be passed in succession.

The prism element 12 also can be combined with the collecting lens 10 and integrated thereat in that it is designed as a multi-zone lens having zones containing different optical axes. In FIG. 3, for instance one-half of the Fresnel lens 11 can be provided at its front side or rear side with a wedge 13 which replaces the prism 12 and exhibits the same optical effect. Such optical element is particularly simple to fabricate and does not require any special adjustment.

The illustrated infrared intrusion detector possesses an optimum sensitivity, notwithstanding its flat inconspicuous shape and its small dimensions, and additionally possesses a particularly simple construction which is not prone to disturbances. It is particularly suitable for fields of application where there is desired an infrared protective curtain containing closely adjacently situated receiving regions or fields of view located in a plane. In order to optimumly construct the detector for the detection of intruding individuals or the like it is therefore advantageous to construct the Fresnel lens from a material which preferably passes infrared radiation in the far range in the spectral region of the body radiation and as the sensor element there likewise is preferably employed an element which is sensitive in the infrared region, for instance a pyroelectric element formed of lithium-tantalate-polyvinyldifluoride or lead-zirconate-titanate.

The intrusion detector according to FIG. 3 further can be constructed such that the radiation collecting element 2 of tubular-shaped configuration, i.e. the tube or pipe 50, is rotatably arranged uniformly about its linearly directed axis, as the same has been indicated by the arrow of FIG. 3. The openings 4 are then not fixedly arranged upon an axially parallel line, rather are provided at different angles of rotation along the tube surface, for instance along a helical or screw line as indicated for the openings 14 of FIG. 3. Upon rotation of the tubular-shaped radiation collecting element 2 the individual openings 14 then arrive in succession at the focus or focusing surface, i.e. at different times they receive radiation from the related receiving region. This renders possible scanning the different receiving regions in a time-wise staggered fashion.

While there are shown and described present preferred embodiments of the invention, it is to be distinctly understood that the invention is not limited thereto, but may be otherwise variously embodied and practiced within the scope of the following claims. Accordingly,

What I claim is:

1. An infrared intrusion detector comprising:

optical focusing means for focusing infrared radiation emanating from a number of separate receiving regions;

a sensor arrangement for receiving the infrared radiation received from said number of separate receiving regions in order to enable evaluation of the received radiation in the presence of a predetermined change thereof for purposes of giving an alarm signal;

said focusing means containing a focusing surface;

said sensor arrangement comprising a substantially lengthwise extending radiation collecting element arranged at least approximately at the focusing surface of the focusing means;

said lengthwise extending radiation collecting element having surface means structured so as to be inwardly reflective;

said lengthwise extending radiation collecting element having a lengthwise extending side and an end;

said lengthwise extending side containing a plurality of radiation inlet openings; and an infrared sensor element provided for said end of said radiation collecting element.

2. The infrared intrusion detector as defined in claim 1, wherein:

said radiation collecting element possesses a substantially circular-shaped cross-sectional configuration.

3. The infrared intrusion detector as defined in claim 1 or 2, wherein:

said radiation collecting element is constructed as an air-filled tube which is internally coated; and said tube having an outer surface containing said radiation inlet openings.

4. The infrared intrusion detector as defined in claim 1 or 2, wherein:

said radiation collecting element is structured as a transparent body having a surface;

a reflective coating provided for said surface; and said reflective coating being interrupted at a number of locations so as to define said radiation inlet openings.

5. The infrared intrusion detector as defined in claim 1, wherein:

said focusing means comprises a reflector.

6. The infrared intrusion detector as defined in claim 5, wherein:

said reflector is structured as a spherical mirror; and said radiation collecting element being arranged at the site of a sphere arranged substantially concentrically with respect to said spherical mirror and having a radius which is approximately one-half the size of the radius of said spherical mirror.

7. The infrared intrusion detector as defined in claim 1, wherein:

said focusing means comprises a collecting lens.

8. The infrared intrusion detector as defined in claim 7, wherein:

said collecting lens is a Fresnel lens.

9. The infrared intrusion detector as defined in claim 8, wherein:

said Fresnel lens is formed of a material which is pervious to infrared radiation in the far range.

10. The infrared intrusion detector as defined in claim 7, further including:

a prism element arranged adjacent the collecting lens in order to split and multiply the receiving regions.

11. The infrared intrusion detector as defined in claim 10, wherein:

said prism element is arranged forwardly of said collecting lens.

12. The infrared intrusion detector as defined in claim 10, wherein:

said prism element is arranged behind said collecting lens.

13. The infrared intrusion detector as defined in claim 10, wherein:

said prism element is united with said collecting lens so as to define a multi-zone lens possessing a number of zones having different optical axes.

14. An infrared intrusion detector comprising:

optical focusing means for focusing infrared radiation emanating from a number of separate receiving regions;

a sensor arrangement for receiving the infrared radiation received from said number of separate receiving regions in order to enable evaluation of the received radiation in the presence of a predetermined change thereof for purposes of giving an alarm signal;

said focusing means containing a focusing surface;

said sensor arrangement comprising a substantially lengthwise extending radiation collecting element arranged at least approximately at the focusing surface of the focusing means;

said lengthwise extending radiation collecting element having surface means structured so as to be inwardly reflective;

said lengthwise extending radiation collecting element having a lengthwise extending side and an end;

said lengthwise extending side containing a plurality of radiation inlet openings;

an infrared sensor element provided for said end of said radiation collecting element;

said radiation collecting element possesses a substantially circular-shaped cross-sectional configuration;

said radiation collecting element has a linear axis;

said radiation collecting element being rotatable essentially uniformly about said linear axis;

and said radiation inlet openings being provided at the surface of said radiation collecting element in a manner such that at different angles of rotation of said rotatable radiation collecting element said openings, during rotation of said radiation collecting element, are brought into the focusing surface at different points in time.

* * * * *